(12) United States Patent
Sharma

(10) Patent No.: US 6,629,213 B1
(45) Date of Patent: Sep. 30, 2003

(54) APPARATUS AND METHOD USING SUB-CACHELINE TRANSACTIONS TO IMPROVE SYSTEM PERFORMANCE

(75) Inventor: Debendra Das Sharma, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/561,689

(22) Filed: May 1, 2000

(51) Int. Cl.<sup>7</sup> ............................................. G06F 12/04
(52) U.S. Cl. ....................................................... 711/144
(58) Field of Search .................................. 711/144, 145

(56) References Cited

U.S. PATENT DOCUMENTS

| | | | | |
|---|---|---|---|---|
| 4,493,026 A | * | 1/1985 | Olnowich | 364/200 |
| 5,386,547 A | * | 1/1995 | Jouppi | 395/425 |
| 5,784,590 A | * | 7/1998 | Cohen et al. | 395/449 |
| 5,835,929 A | * | 11/1998 | Gaskins et al. | 711/3 |
| 6,249,845 B1 | * | 6/2001 | Nunez et al. | 711/129 |
| 6,332,179 B1 | * | 12/2001 | Okpisz et al. | 711/140 |

OTHER PUBLICATIONS

Handy, "The Cache Memory Book", 1993, p. 72–74.*

* cited by examiner

*Primary Examiner*—Kevin L. Ellis
(74) *Attorney, Agent, or Firm*—Clare T. Hartnett

(57) ABSTRACT

A mechanism that includes an apparatus and method for accessing a segment of data from main memory that less than the size of a cacheline is herein disclosed. I/O devices connected to an I/O bridge unit having one or more caches make DMA read and write requests for sub-cachelines of data that are less than the cacheline size.

9 Claims, 7 Drawing Sheets

APPARATUS AND METHOD USING SUB-CACHELINE TRANSACTIONS TO IMPROVE SYSTEM PERFORMANCE

FIELD OF THE INVENTION

The present invention relates generally to computer systems. More particularly, the invention relates to a mechanism that improves system performance by utilizing sub-cacheline transactions.

BACKGROUND OF THE INVENTION

A current trend in the design of I/O systems is to use a cache in the host bridge for transferring data to and from I/O devices. The presence of one or more caches in the host bridge means that the host bridge has to participate in cache coherency actions including resolving conflicts when the same cacheline is accessed by multiple caches. For example, portions of data can be used by one device for one purpose and another portion of the same data can be used by another device for another purpose. For instance, the lower bytes of a cacheline can be used for one I/O device to control memory bus traffic whereas the upper bytes of the same cacheline can be used for another device to also control traffic to the processor bus.

A problem that often arises in a cache coherent I/O system is the increased bandwidth associated with accessing an entire cacheline from the main memory. In some applications, only a portion of the cacheline is needed, yet the entire cacheline is transmitted to or from the main memory. For example, in a system where a cacheline is 64 bytes wide, an I/O device may only need 16 bytes of the cacheline. However, when the host bridge fetches the cacheline from main memory, the entire 64 bytes is transmitted from the main memory to the host bridge. This increases the amount of bandwidth on the interconnect that connects the host bridge and the main memory and hence, decreases the overall I/O performance. Accordingly, there is a need to overcome this shortcoming.

SUMMARY OF THE INVENTION

In summary, the technology of the present invention pertains to a mechanism that allows an I/O device to obtain a portion of cacheable data that is less than the size of the cache line. In this manner, the bandwidth from the I/O bridge to the main memory is reduced along with the bandwidth of the memory subsystem thereby improving the overall performance of the I/O subsystem.

A computer system utilized herein has an I/O subsystem connected by a high speed interconnect to a memory controller unit having access to main memory. The I/O subsystem includes one or more I/O devices connected to an I/O bridge that is connected to the high speed interconnect. The I/O bridge has one or more cache units that store cacheable data which is shared within the computer system.

An I/O device can request access to cacheable data by making a DMA read or write request to its associated I/O bridge unit. The I/O bridge unit may have one or more cache units that service the DMA requests. Each cache unit includes a cache controller unit and a cache having a tag, status, and data units. Each cacheline in the data unit comprises a predetermined number of bytes (power of 2) and has an associated line in the tag and status units. A tag line includes the cache line address and the status line includes status bits indicating a number of states associated with the cacheline.

An I/O device can request a portion of data that is less than the size of the cacheline and which is herein referred to as a sub-cacheline. For illustration purposes, an exemplary cache line can be 64 bytes with each sub-cacheline being 16 bytes that are aligned on a 16 byte boundary. The status line includes valid bits for each 16 byte sub-cacheline. The 16 byte valid bits indicate whether the corresponding sub-cacheline is valid or invalid.

An I/O device can initiate a DMA read request for a sub-cacheline that is not resident in the I/O bridge from main memory. The cache controller obtains the requested sub-cacheline which is then stored in the I/O bridge unit's cache unit. In addition an I/O device can also initiate DMA write requests for a portion of data within a sub-cacheline and one or more sub-cachelines. Other I/O devices can read or write to other sub-cachelines in the same cacheline provided that the requested sub-cachelines are valid. The 16 byte valid bits are used to track the validity of each sub-cacheline.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
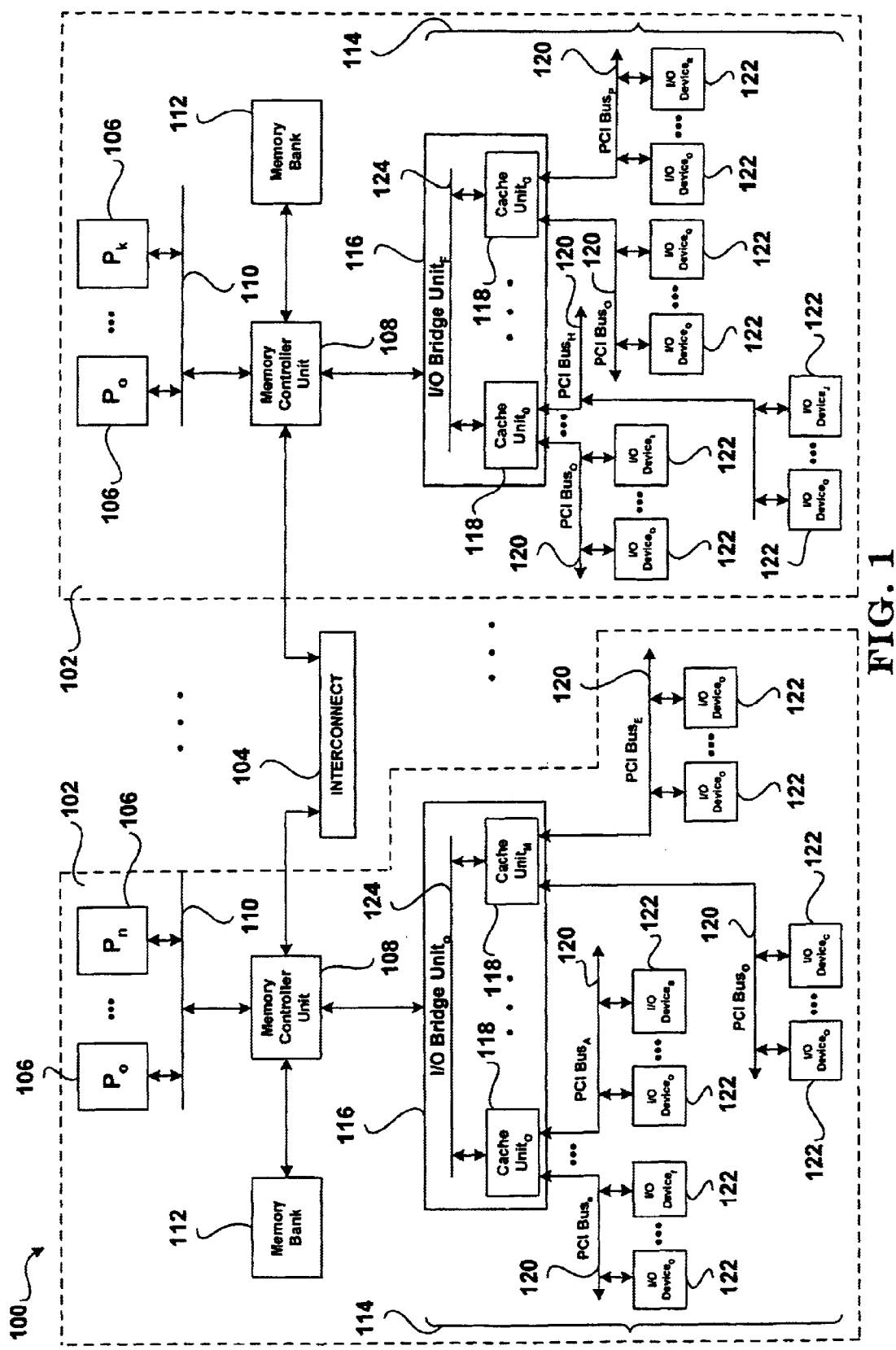
FIG. 1 is a schematic view of an exemplary computer system in accordance with an embodiment of the present invention.

FIG. 1 illustrates an exemplary computer system 100 embodying the technology of the present invention. There is shown a number of cells 102 connected through an interconnect 104. Each cell 102 can include a number of processors (e.g., $P_0$–$P_n$) 106 connected to a memory controller unit 108 by a first communication link 110, such as a bus. The memory controller unit 108 is also connected to a memory bank 112 and an I/O subsystem 114.

The processors 106 can be any type of processor or central processing unit ("CPU"), such as but not limited to, microprocessors and the like. Examples of such microprocessors include the Hewlett-Packard ("HP") PA-RISC family of microprocessors, the Intel IA-32 and IA-64 microprocessors, and the like. Each processor 106 has several levels of internal caches (not shown) that store a portion of the system memory that can be accessed by other processors 106 in the cell 102 and by other cells 102.

The memory controller unit 108 controls access to the system memory. The memory banks 112 can be composed of any type of memory device or combination thereof, such as DRAM, SRAM, RAM, flash memory, and the like.

Each cell 102 includes a portion of the system memory and the requisite components that maintain the system memory in a coherent manner. The system memory image of the multiprocessor computer system 100 is distributed throughout each cell 102 and can be partitioned to be accessible within each cell 102 and by other cells 102. For example, the system memory can include interleaved memory which is memory that is interleaved across cells 102 or non-interleaved memory which is memory that is accessible within a cell 102.

The interconnect 104 can be any type of high-speed communication link, such as but not limited to, a network, point-to-point link, crossbar switch, or the like.

The I/O subsystem 114 can include an I/O bridge unit 116 connected to a number of I/O devices 122 through a second bus 120, such as the Peripheral Component Interface ("PCI") bus. It should be noted that the technology of the present invention is not limited to the PCI bus 120 and that other communication links can be used. A more detailed description of the architecture and operation of the PCI bus can be found in Solari and Willse, *PCI Hardware and Software Architecture and Design*, 4th edition, Annabooks (1998), in Mindshare, *PCI System Architecture*, 3rd edition, Addison Wesley (1996), and in *PCI Specification rev.* 2.1 from the PCI Special Interest Group (http://www.pcisig.com), each of which are hereby incorporated by reference as background information.

The I/O bridge unit 116 includes one or more cache units 118 that can store a select portion of the system memory. It should be noted that the I/O bridge unit 116 includes other components that are not shown. The cache units 118 are connected by a local communications link 124, such as a bus, and are connected to the memory controller unit. Each cache unit 118 is also connected to one or more PCI buses 120 that are coupled to one or more I/O devices 122. The I/O devices 122 can include, but are not limited to, host bus adapters, bus bridges, graphics adapter, printers, audio peripherals, motion video peripherals, and the like.

Figure 2:
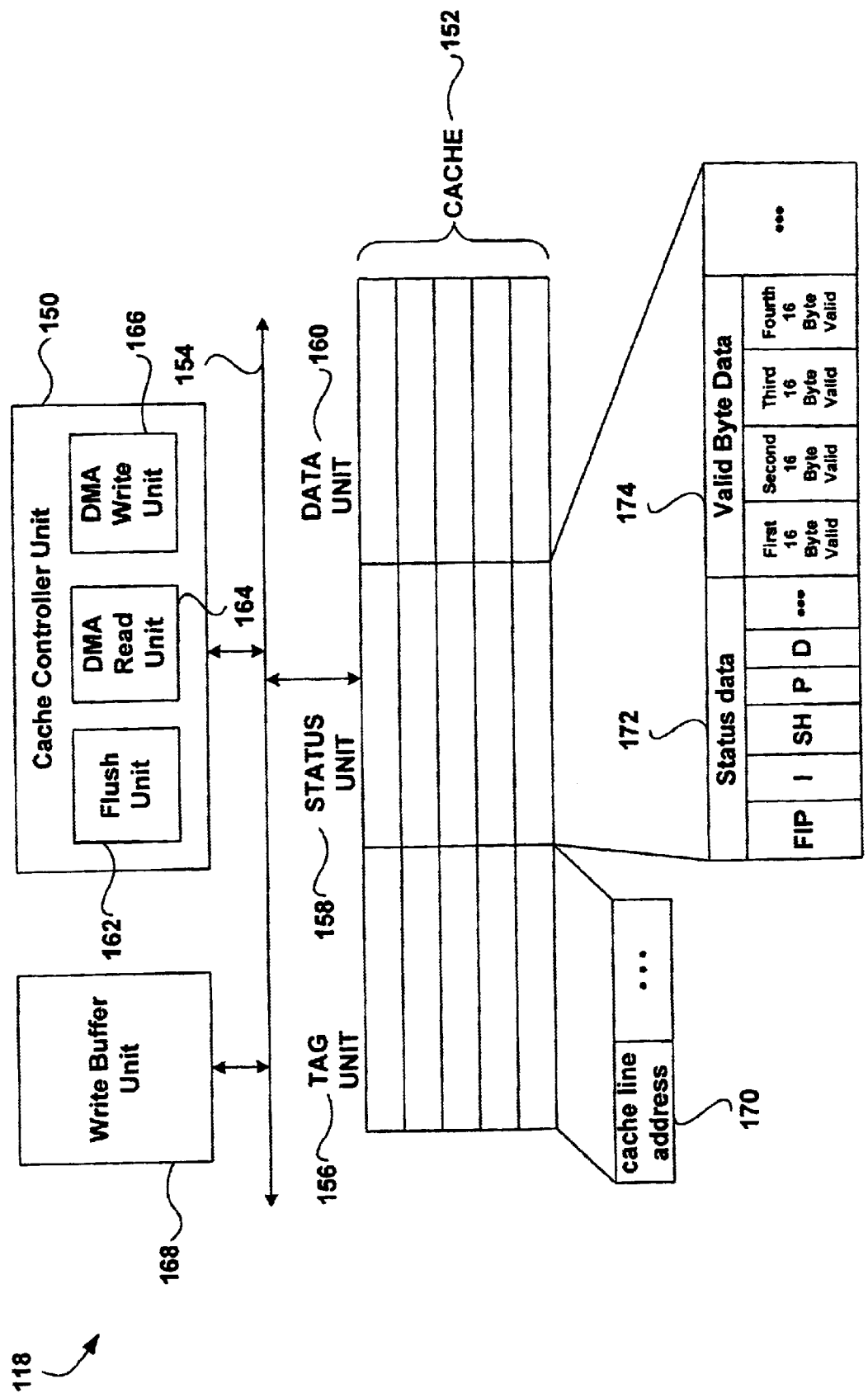
FIG. 2 is a block diagram illustrating the cache unit of the I/O bridge unit shown in FIG. 1.

FIG. 2 illustrates the cache unit 118 in further detail. Each cache unit 118 includes a cache controller unit 150 that is connected to a cache 152 through a local communication link 154, such as a bus. The cache controller unit 150 can include a flush unit 162, a DMA read unit 164, and a DMA write unit 166. The flush unit 162 flushes cache entries in accordance with a cache flush methodology, the DMA read unit 164 processes the DMA read requests for a sub-cacheline or cacheline, and the DMA write unit 166 processes the DMA write requests for a sub-cacheline or cacheline. In addition, there is a write buffer unit 168 that stores write data received from an I/O device in connection with a DMA write request.

The cache 152 can be composed of a tag unit 156, a status unit 158, and a data unit 160. The data unit 160 stores a single cacheline, which is preferably 64-bytes of data. Each cacheline has an associated tag line that is stored in the tag unit 156 and an associated status line that is stored in the status unit 158. A tag line 156 can include the cacheline address 170 which is the address of the cacheline in the associated data unit 160 as well as other data.

An exemplary layout of the status line 158 is also shown in FIG. 2 and can include the following data:
status data, 172—the status data 170 can indicate one or more of the following cacheline states:
FIP—indicates Fetch-In-Progress("FIP") state which means that the cacheline is being fetched by the cache unit 118;
I—indicates invalid state which means the cacheline does not represent the current value of the data;
SH—indicates shared state which means the cacheline is present in the cache 152 and contains the same value as in main memory. Another device may read this cacheline but cannot write to it;
P—indicates private state which means that the cacheline is present in the cache 152 and the cache 152 has read and write access to the cacheline. Private also includes exclusive or modified states. Exclusive means that the cacheline contains the same value as in main memory. Modified means that the cacheline contain a more recent value than main memory. A cacheline with a private state is considered valid in the cache 152 although it is considered invalid in other caches;
as well as other data that is not shown;
Valid Byte Data, 174—the valid byte data can indicate one or more of the following:
First 16 bytes valid—indicates that the first 16 bytes of the cacheline are valid when set ('1'b) and when clear ('0'b), these bytes are invalid;
Second 16 bytes valid—indicates that the second 16 bytes of the cacheline are valid when set ('1'b) and when clear ('0'b), there bytes are invalid;
Third 16 bytes valid—indicates that the third 16 bytes of the cacheline are valid when set ('1'b) and when clear ('0'b), there bytes are invalid; and
Fourth 16 bytes valid—indicates that the fourth 16 bytes of the cacheline are valid when set ('1'b) and when clear ('0'b), there bytes are invalid;
as well as other data.

The foregoing discussion has described an exemplary computer system 100 that embodies the technology of the present invention. Attention now turns to a description of the operation the sub-cacheline transaction with respect to a DMA read request.

Figure 3A:
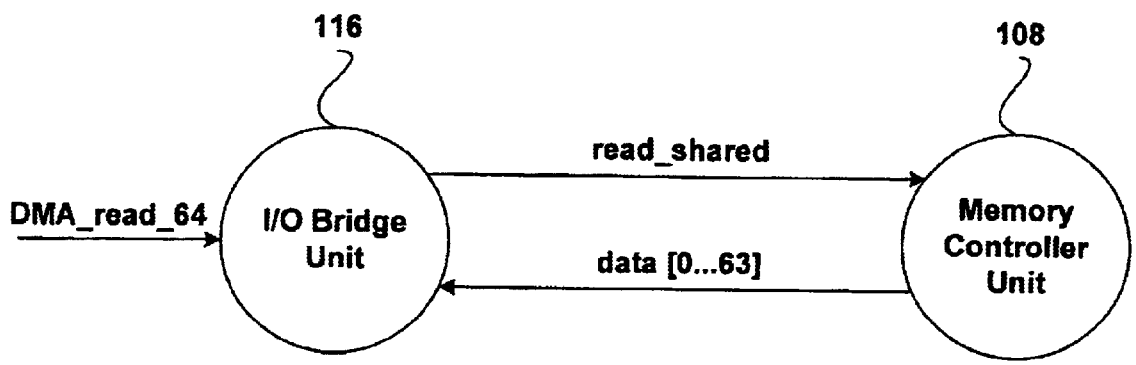
FIGS. 3A–3B are block diagrams illustrating exemplary transactions used to obtain a cacheline in accordance with an embodiment of the present invention.
Figure 3B:
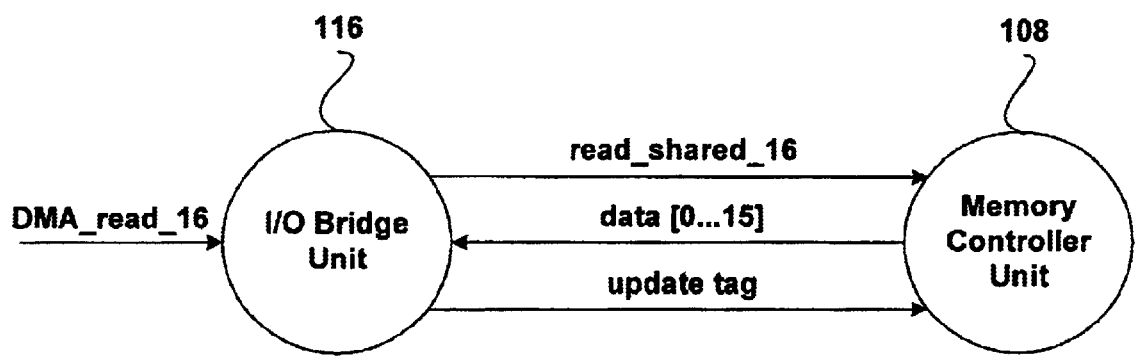

FIGS. 3A and 3B illustrate two scenarios of a DMA read request. It should be noted that these scenarios are used to illustrate the technology of the present invention and that the technology of the present invention is not limited to these scenarios. One skilled in the art can easily adapt the technology of the present invention to accommodate other scenarios as well. For illustration purposes only, it is assumed that the I/O bridge 116 needs to obtain the requested data from the memory controller unit 108. This may be due to the fact that the requested data does not reside in the cache 152, the cache 152 does not have a valid copy of the data in the cache 152, or the like.

The DMA read request is initiated by an I/O device 122 to the I/O bridge 116 for a full cacheline of data as shown in FIG. 3A and for a sub-cacheline of data as shown in FIG. 3B. The I/O bridge 116 then initiates various commands to the memory controller unit 108 to obtain the requested data.

As shown in FIG. 3A, the I/O bridge unit 116 receives a request for a full cacheline of data, DMA_read_64. The I/O bridge unit 116 then requests a copy of the entire cacheline from the memory controller unit 108 by transmitting the read_shared command. In return, the memory controller unit 108 transmits the entire cacheline, data[0 . . . 63] back to the I/O bridge 116 where it is then placed in the cache 152.

FIG. 3B illustrates the scenario where the I/O device 122 requests a 16-byte sub-cacheline, DMA_read_16. The I/O bridge unit 116 then requests a copy of the 16-byte sub cacheline from the memory controller unit 108 by transmitting the read_shared_16 command. In response, the memory controller unit 108 transmits the requested 16 bytes (data [0 . . . 15]) back to the I/O bridge unit 116 where it is then placed in the cache 152. At a later time, another I/O device may request ownership of the entire cacheline in conjunction with another DMA read request. At that time, the 16 byte sub-cacheline is updated (i.e., update _tag) to main memory before the next DMA request is processed.

Figure 4:
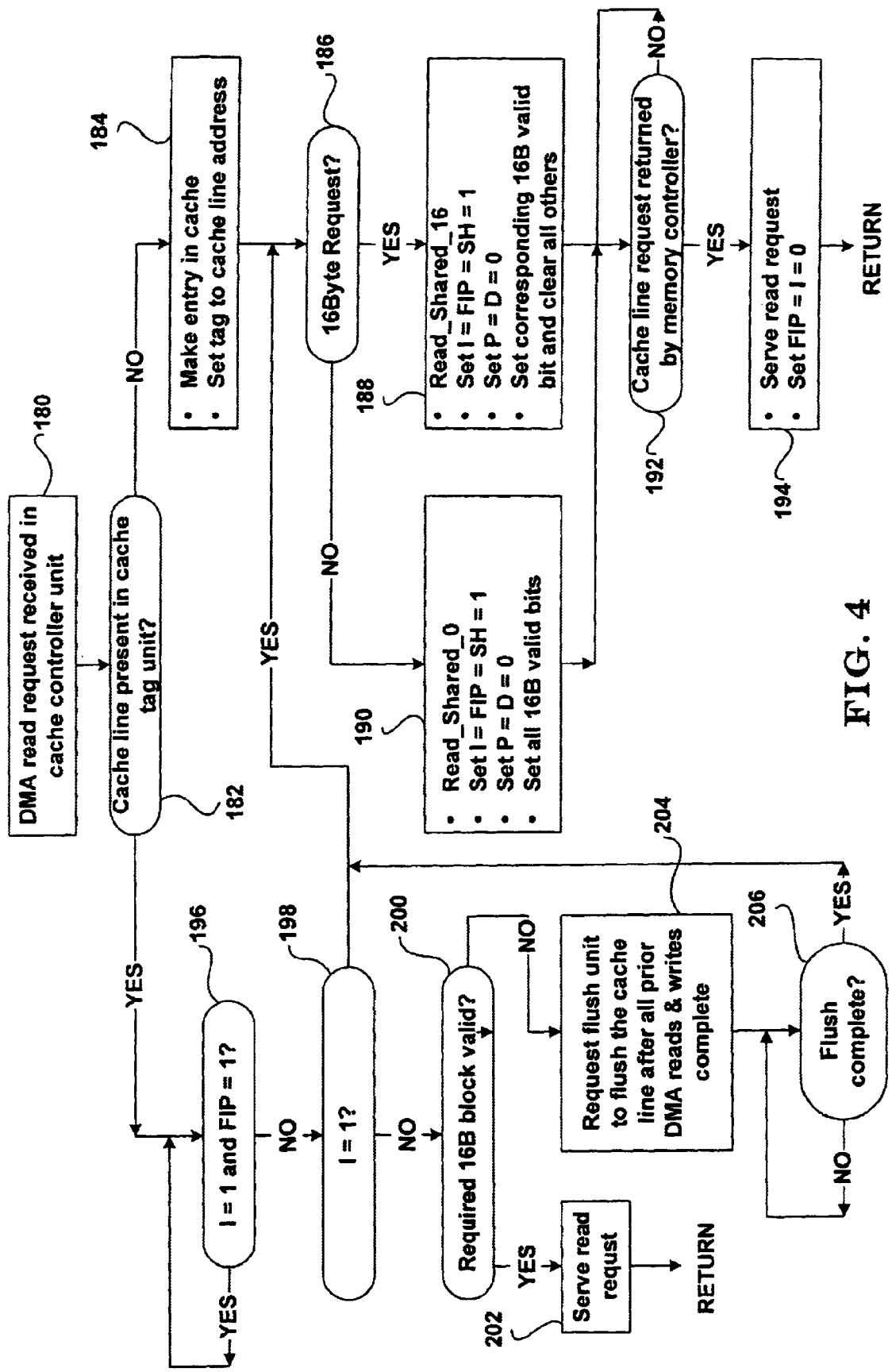
FIG. 4 is a block diagram illustrating the steps used by the cache controller unit to process DMA read requests to the memory controller unit in accordance with an embodiment of the present invention.

The actions taken by the DMA read request unit of the cache controller unit 150 in processing a DMA read request is discussed in more detail with respect to FIG. 4. The cache controller unit 150 will receive a DMA read request from an I/O device 122 (step 180). If the cacheline is not present in the cache tag unit 156 (step 182-NO), then the cache controller unit 150 makes an entry for the requested cacheline in the cache 152 and sets the tag line to the cacheline address (step 184). If the DMA read request is for a 16 byte segment of the cacheline that is aligned on a 16 byte boundary (step 186-YES), then the cache controller unit 150 requests from the memory controller unit 108 a copy of the requested 16 bytes through the Read_Shared_16 command (step 188). The invalid, fetch-in-progress, and shared status bits are set (i.e., I=FIP=SH='1'b), the private and dirty status bits are cleared (i.e., P=D='0'b), the corresponding 16 byte valid bit is set, and the other 16 byte valid bits are cleared (step 188).

If the DMA read request is for a full cacheline and not for a 16 byte segment (step 186-NO), then the cache controller unit 150 requests from the memory controller unit 108 a copy of the entire cacheline through the Read_Shared command (step 190). The invalid, fetch-in-progress, and shared status bits are set (i.e., I=FIP=SH='1'b), the private and dirty status bits are cleared (i.e., P=D='0'b), and all the 16 byte valid bits are set (step 190).

When the requested cacheline or sub-cacheline is returned to the cache controller unit 150 (step 192-YES), then the cacheline or sub-cacheline is placed in the cache 152 and sent to the requesting I/O device 122, and the fetch-in-progress and invalid bits are cleared (i.e., I=FIP='0'b) (step 194).

If the cacheline is present in the cache tag unit 156 (step 182-YES), then the cache controller unit 150 checks if there is an outstanding request for the cacheline is progress (i.e., I=FIP=1) (step 196). If such an outstanding request exists (step 196-YES), then the DMA read request is not processed further until the outstanding request is completed.

Otherwise (step 196-NO), the cache controller unit 150 checks if the existing cacheline is invalid and if so (step 198-YES), the requested cacheline is fetched from the memory controller unit 108 as described above in steps 186–194.

If the requested cacheline is valid and the 16-byte sub-cacheline segment is valid (step 198-NO, 200-YES), then the requested 16-byte sub-cacheline segment is returned to the requesting I/O device 122 (step 202). Otherwise (step 200-NO), the flush unit 162 will flush the entire cacheline from the cache 152 once all pending DMA read and write requests have completed (step 204) and which is described in more detail in FIG. 5. Once flushed (step 206-YES), the requested cacheline is fetched from the memory controller unit 108 as described above in steps 186–194.

Figure 5:
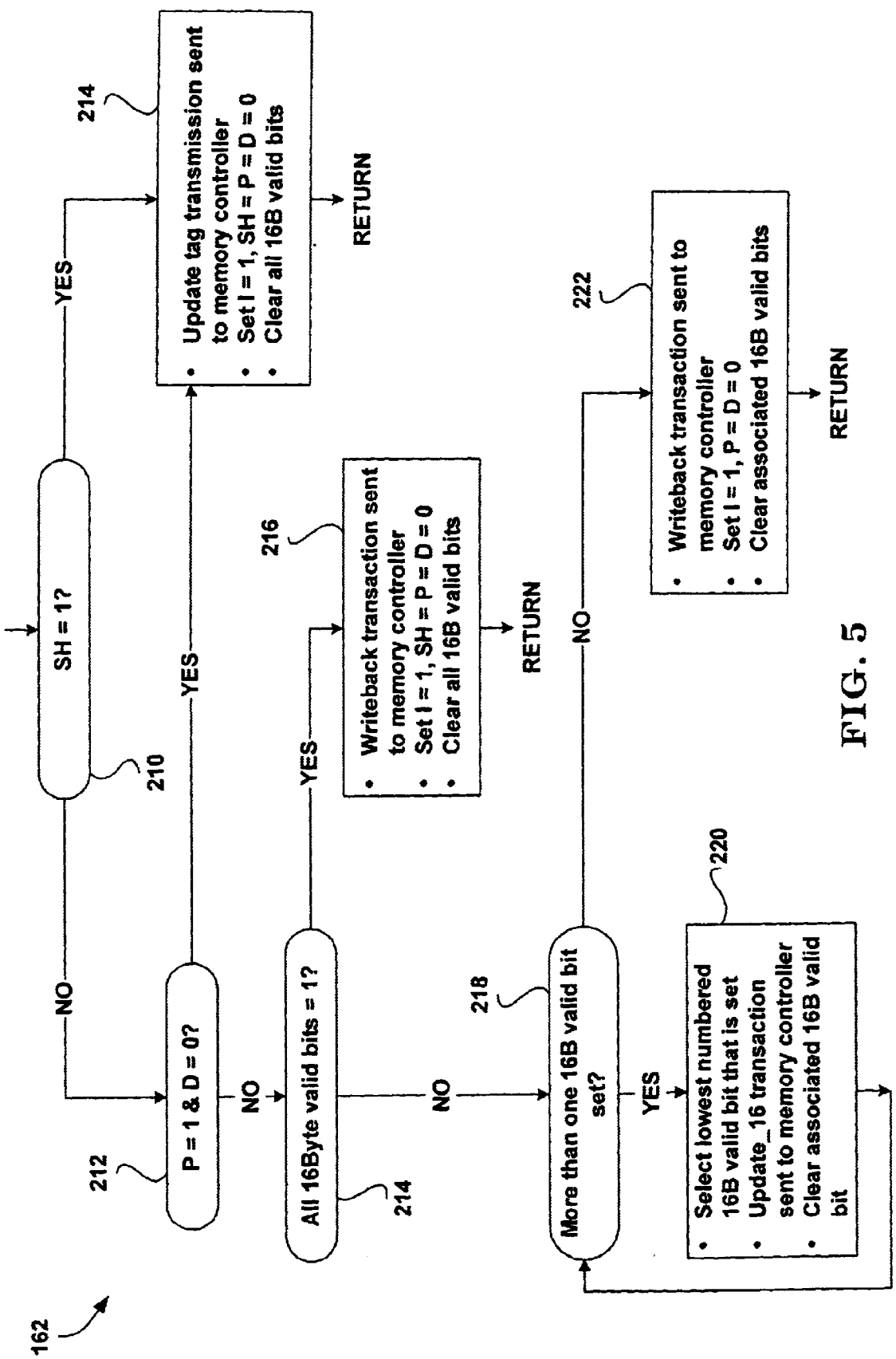
FIG. 5 is a block diagram illustrating the steps used by the cache controller unit to fetch a cacheline in accordance with an embodiment of the present invention.

FIG. 5 illustrates the steps used by the flush unit 162 of the cache controller unit 150 to flush a specified cacheline from the cache 152. If the cacheline is marked in the shared state (i.e., S='1'b) (step 210-YES) or the cacheline is not shared but in the private state and not dirty (i.e., P='1'b and D='0'b) (step 212-YES), an update tag transaction is sent to the memory controller unit 108 indicating that the cache controller unit 150 will retain ownership of the Catalina and will write back the current value of the cacheline to main memory (step 214). In addition, the invalid state is set (i.e., I='1'b), the shared, private, and dirty bits are cleared (i.e., SH=P=D='0'b), and the 16 byte valid bits are all cleared (step 214).

Otherwise (step 210-NO, step 212-NO), if all the 16 byte valid bits are set (step 214-YES), then the flush unit 162 issues a write back transaction for the entire cacheline to the memory controller unit 108, sets the invalid status bit, clears the shared, dirty, and private status bits, and clears all the 16 byte valid bits (step 216).

If more than one of the 16 byte valid bits are set, then each 16 byte sub-cacheline segment but the last 16 byte segment is written back to main memory without giving up ownership of the cacheline (i.e., update_16 transaction) (step 218-YES). As each 16 byte sub-cacheline segment is written back, the corresponding 16 byte valid bit is cleared (steps 220, 222) . The last 16 byte sub-cacheline segment is written back to main memory with ownership of the cacheline released by the flush unit 162 (i.e., writeback_16 transaction ) (step 222). This process proceeds with the lower numbered 16 byte segments that have their corresponding 16 byte valid bits set being written back in sequential order first (i.e., update_16) (step 220) while the highest numbered 16 byte segment is written back last with a writeback_16 transaction (step 222). Once the last 16 byte sub-cacheline segment is written back to main memory (step 218-NO), the cacheline is invalidated and the private and dirty status bits are cleared (step 222). It should be noted that an Update_16 transaction only gives data to memory controller while maintaining the ownership of the cache line. In contrast, the Write_back_16 transaction, like the Write_back transaction, gives up ownership of the cache line while providing the updated data to the memory controller.

Figure 6A:
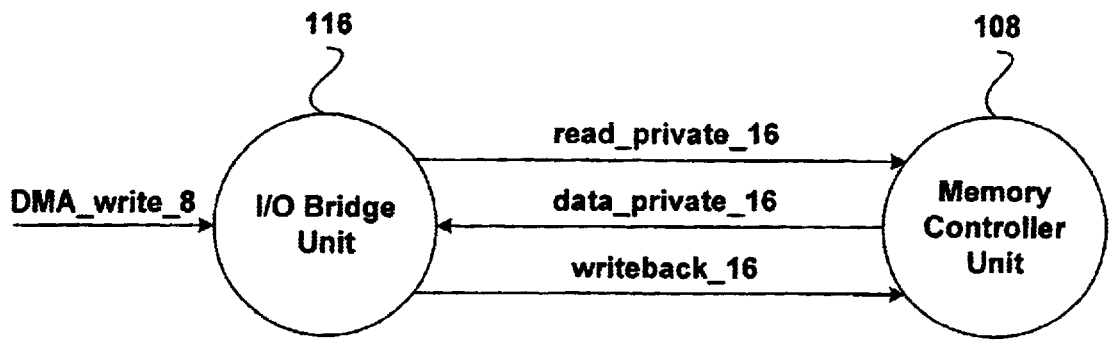
FIGS. 6A–6C are block diagrams illustrating exemplary transactions used to write a cacheline to main memory in accordance with an embodiment of the present invention.
Figure 6B:
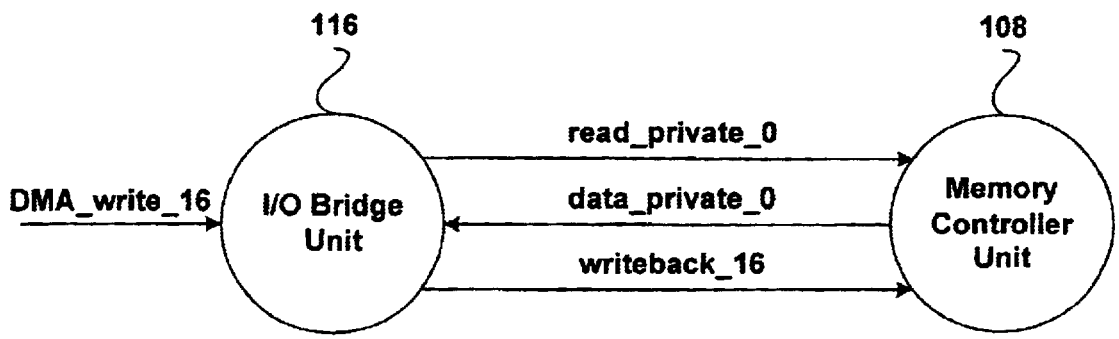
Figure 6C:
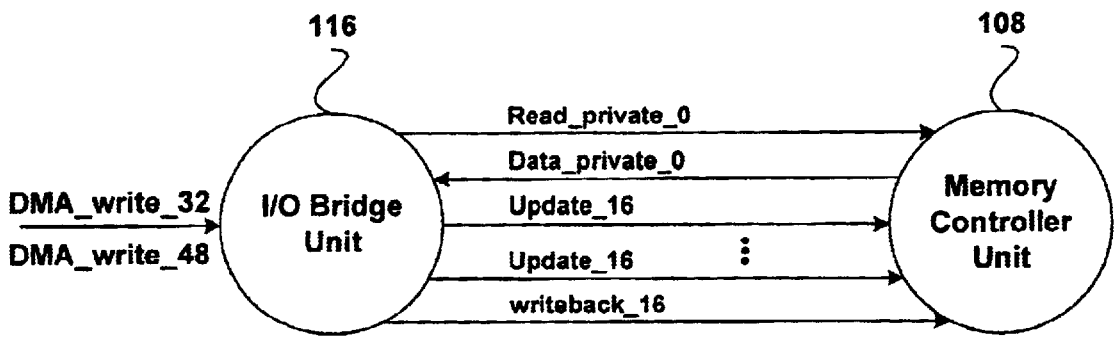

Attention now turns to the processing of a DMA write request. FIGS. 6A–6C illustrate three exemplary scenarios of a DMA write request. It should be noted that these scenarios are used to illustrate the technology of the present invention but the technology of the present invention is not limited to these scenarios. One skilled in the art can easily adapt the technology of the present invention to accommodate other scenarios as well.

A DMA write request is initiated by an I/O device 122 to the I/O bridge 116 for a segment of a sub-cacheline of data as shown in FIG. 6A and for one or more sub-cachelines as shown in FIGS. 6B–6C. The I/O bridge 116 then initiates various commands to the memory controller unit 108 to obtain ownership of the data in order to write the data in its cache. At a later time, the data can be flushed out of the cache either due to a subsequent snoop request or due to the staleness of the data. A writeback or update transaction is used to post the updated value of the sub-cacheline to main memory.

As shown in FIG. 6A, the I/O bridge unit 116 receives a request from an I/O device 122 to write an 8 byte portion of data that lies within a 16-byte sub-cacheline (i.e., DMA_write_8). The I/O bridge unit 116 receives the 8 bytes. Before the data can be written into the cache, the I/O bridge unit 116 obtains ownership of the corresponding 16-byte sub-cacheline from the memory controller unit through the read_private_16 command. The memory controller unit 108 notifies the I/O bridge unit 116 that it has obtained ownership of the corresponding 16-byte sub-cacheline by sending the data_private_16 command to the I/O bridge unit 116. At a later time, the entire 16-byte sub-cacheline is written back to main memory through a writeback_16 transaction.

FIG. 6B illustrates the scenario where the DMA write request is for a 16 byte sub-cacheline that is aligned on a 16-byte boundary (i.e., DMA_write_16). In this scenario, the I/O bridge unit 116 requests ownership of the entire cacheline first by sending the read_private_0 command to the memory controller unit 108. When ownership is obtained, the memory controller unit 108 sends a data_private_0 command to the I/O bridge unit 116. At a later time, the entire 16-byte sub-cacheline is written back to main memory through a writeback_16 transaction.

FIG. 6C illustrates another scenario where the DMA write request is for more than one 16-byte aligned sub-cacheline (i.e., DMA_write_32 or DMA_write_48). In this scenario, the I/O bridge unit 116 requests ownership of the entire cacheline first by sending the read_private_0 command to the memory controller unit 108. When ownership is obtained, the memory controller unit 108 sends a data_private_0 command to the I/O bridge unit 116. At a later time, the requested sub-cachelines are written back to main memory through the update_16 and writeback_16 transactions.

Figure 7:
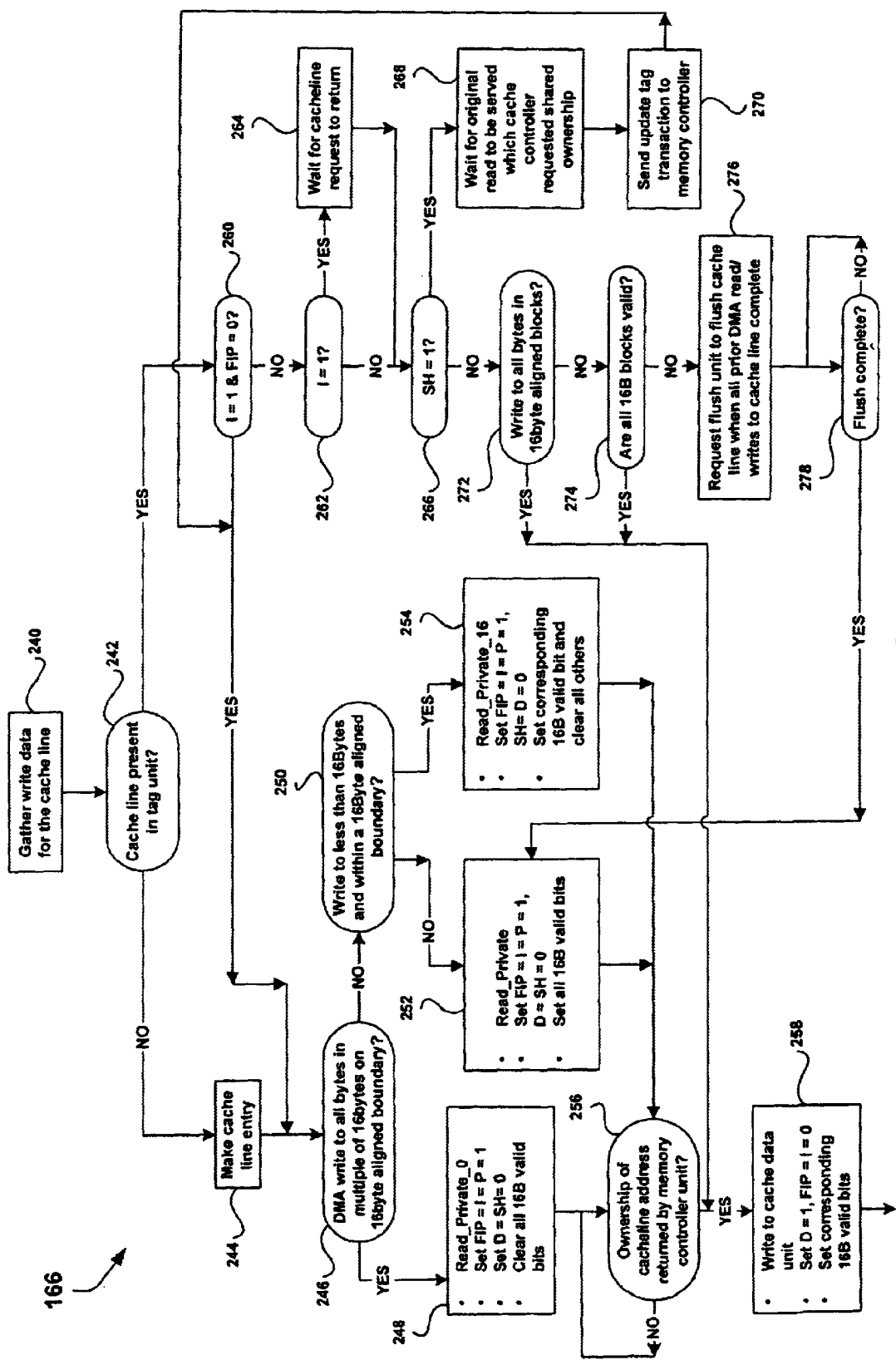
FIG. 7 is a block diagram illustrating the steps used by the cache controller unit to process DMA write requests to the memory controller unit in accordance with an embodiment of the present invention.

A more detailed discussion of the processing of the DMA write transaction is found in FIG. 7. When the I/O bridge unit 116 receives a DMA write request, the write data is stored in the write buffer unit 168 (step 240). The DMA write unit 166 of the cache controller unit 150 then performs the following steps. First, a determination is made as to whether the cacheline is present in the cache tag unit 156 (step 242). If the cacheline is not present in the cache tag unit 156 (step 242-NO), an entry is made by placing the cacheline address in the cache tag unit 156 (step 244).

If the DMA write request is for all bytes in multiple of 16-byte sub-cachelines that are aligned on a 16-byte boundary (step 248), the cache controller unit 150 obtains ownership of the entire cacheline by transmitting a read_private_0 command to the memory controller unit 108 (step 248). The read_private_0 transaction only requests ownership of the cacheline, without any associated data, from the system memory controller. The fetch-in-progress, invalid, and private status bits are set (i.e., FIP=I=P='1'b), the dirty and shared bits are cleared (i.e., D=SH='0'b), and all the 16 byte valid bits are cleared (step 248).

If the DMA write request is not for less than 16 bytes in a 16-byte aligned boundary or not in multiple of 16-byte chunks, (step 250-NO), then the cache controller unit 150 obtains ownership as well as data for the entire cacheline by transmitting a read_private command to the memory controller unit 108 (step 252). The fetch-in-progress, invalid, and private status bits are set (i.e., FIP=I=P='1'b), the dirty and shared bits are cleared (i.e., D=SH='0'b), and all the 16 byte valid bits are set (step 252).

If the DMA write request is for a portion of data that is less than 16-bytes and within a 16-byte sub-cacheline (step 250-YES), then the cache controller unit 150 obtains ownership of the 16-byte sub-cacheline by transmitting a read_private_16 command to the memory controller unit 108 (step 254). The fetch-in-progress, invalid, and private status bits are set (i.e., FIP=I=P='1'b), the dirty and shared bits are cleared (i.e., D=SH='0'b), the corresponding 16 byte valid bit is set, and all the other 16 byte valid bits are cleared (step 254).

Once ownership of the cacheline is returned by the memory controller unit 108 (step 256-YES), the data is written into the cache data unit 160, the dirty bit is set, the fetch-in-progress and invalid bits are cleared, and the corresponding 16 byte valid bit is set (step 258).

If the cacheline is present in the cache tag unit 156 and the cacheline is invalid and there is no outstanding fetch for the cacheline (step 242-YES, 260-YES), then ownership of the cacheline is obtained as described above with respect to steps 246 through 258.

If the cacheline is present in the cache tag unit 156, the cacheline is invalid, and there is a outstanding fetch for the cacheline (step 242-YES, 260-NO, 262-YES), then no further action is taken until the cacheline is returned to the cache 152 (step 264). Once the cache line request is served by the system memory controller, we go to step 266. Step 266 deals with the case where the cache line is already present in the cache.

If the cacheline is present in the cache tag unit 156, the cacheline is valid, an outstanding fetch exists for the cacheline, and the data is marked shared (step 242-YES, 260-NO, 262-NO, 266-YES), then once the data is read into the cache 152 (step 268), an update_tag transaction is sent to the memory controller unit 108 (step 270). An update_tag transaction relinquishes ownership of the cache line without sending any data. Next, the cache controller unit 150 obtains ownership of the cacheline as described above with respect to steps 246–258.

If the cacheline is present in the cache tag unit 156, the cacheline is valid, an outstanding fetch exists for the cacheline, the data is not marked shared, and the DMA write request is to all 16-bytes in one or more 16-byte aligned sub-cachelines (step 242-YES, 260-NO, 262-NO, 266-NO, 272-YES), then the data is written into the cache data unit 160 as described above with respect to step 258. Otherwise, if the DMA write request is for a segment of the 16-byte cacheline that is valid (step 272-NO, 274-YES), then the data is written into the cache data unit 160 as described above with respect to step 258. If the 16-byte cacheline is not valid (step 274-NO), then the cacheline is flushed by the flush unit 162 as described above in FIG. 5 once all outstanding writes and/or reads to the cacheline are complete (step 276) and ownership of the cacheline is obtained as described above with respect to steps 252 through 258.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The foregoing description has described the technology of the present invention with respect to a 16-byte sub-cacheline in an I/O subsystem. However, the technology of the present invention is not constrained to any particular cacheline size or sub-cacheline size and other sizes can be used. The technology of the present invention can be used by any component of a system, such as a processor, and is not constrained to be used by an I/O bridge only.

What is claimed is:

1. An I/O bridge that interconnects an I/O devices with a system memory, the I/O bridge comprising:
   a communications connection to a communications medium, linking the I/O bridge to a memory controller, through which the I/O bridge can write data to, and read data from, system memory;
   a communications connection to a communications medium linking the I/O bridge to the I/O device; and
   a cache unit that supports access by the I/O device to sub cachelines stored within cachelines in system memory.

2. The I/O bridge of claim 1, wherein the cache unit includes:
   a data unit that stores cacheline;
   a tag unit that stores an address for each cacheline; and
   a status unit that stores status for each cacheline, the status including a valid flag for each sub cacheline within the cacheline.

3. The I/O bridge of claim 1 wherein the memory controller supports sub cacheline transactions.

4. A computer system containing at least one I/O bridge of claim 1.

5. A method for providing sub cacheline read and write access to an I/O device by an I/O bridge connected to the I/O device and to a memory controller in turn connected to a system memory, the method comprising:
   providing an I/O bridge that includes a cache unit containing
      a data unit that stores cacheline,
      a tag unit that stores an address for each cacheline, and
      a status unit that stores status for each cacheline, the status including a valid flag for each sub cacheline within the cacheline;
   when the I/O bridge receives a read request for a specified sub cacheline from an I/O device,
      returning the specified sub cacheline to the I/O device; and
   when the I/O bridge receives a write request containing a specified sub cacheline,
      transmitting the specified sub cacheline to the memory controller for writing to system memory.

6. The method of claim 5 wherein returning the specified sub cacheline to the I/O device further includes:
   determining whether the cacheline containing the specified sub cacheline is currently resident in the cache unit;
   when the cacheline containing the specified sub cacheline is currently resident in the cache unit,
      determining whether the valid flag for the specified sub cacheline indicates that the specified sub cacheline is valid,
      when the specified sub cacheline is valid,
         returning the specified sub cacheline to the I/O device, and
      when the specified sub cacheline is not valid,
         flushing the cache line containing the specified sub cacheline to memory,
         reading the specified sub cacheline from memory, and
         returning the specified sub cacheline to the I/O device; and
   when the cacheline containing the specified sub cacheline is not currently resident in the cache unit,
      reading the specified sub cacheline from memory, and returning the specified sub cacheline to the I/O device.

7. The method of claim 6 wherein flushing the cache line containing the specified sub cacheline to memory further includes:
   when all valid flags for all sub cachelines in the cacheline containing the specified sub cacheline indicate that all sub cachelines are valid,
      transmitting the entire cacheline to the memory controller in a single operation; and
   when the valid flags for sub cachelines in the cacheline containing the specified sub cacheline indicate that not all sub cachelines are valid,
      transmitting each valid sub cacheline within entire cacheline to the memory controller in separate operations, maintaining ownership of the cacheline until all valid sub cachelines have been transmitted.

8. The method of claim 6 wherein transmitting the specified sub cacheline to the memory controller for writing to system memory further includes:
   determining whether the cacheline containing the specified sub cacheline is currently resident in the cache unit;
   when the cacheline containing the specified sub cacheline is currently resident in the cache unit,
      when the cacheline containing the specified sub cacheline is shared,
         sending an update tag to the memory controller and considering the cacheline not resident in the cache unit, and
      when the cacheline containing the specified sub cacheline is not shared,
         writing the specified cacheline into the cacheline and flushing the cacheline to memory;
   when the cacheline containing the specified sub cacheline is not currently resident in the cache unit,
      setting the valid flags for the cacheline containing the specified sub cacheline to indicate that all sub cachelines are not valid,
      reading the specified sub cacheline from memory,
      writing the specified sub cacheline received from the I/O device to cacheline, setting the valid flag for the specified sub cacheline to indicate that the specified sub cacheline is valid, and
      flushing the cacheline containing the specified sub cacheline.

9. One of firmware, logic circuits, and a combination of firmware and logic circuits within an I/O bridge that carries out the method of claim 5.

* * * * *